US009302211B2

(12) United States Patent
Uoe et al.

(10) Patent No.: US 9,302,211 B2
(45) Date of Patent: Apr. 5, 2016

(54) FIXING JIG, FIXING METHOD, AND HONEYCOMB FILTER PRODUCTION METHOD (75) Inventors: Kousuke Uoe, Niihama (JP); Masaharu Mori, Mitoyo (JP); Ying Gong, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 453 days.

(21) Appl. No.: 13/811,573

(22) PCT Filed: Jul. 22, 2011

(86) PCT No.: PCT/JP2011/066748
§ 371 (c)(1),
(2), (4) Date: Mar. 29, 2013

(87) PCT Pub. No.: WO2012/011581
PCT Pub. Date: Jan. 26, 2012

(65) Prior Publication Data
US 2013/0180111 A1 Jul. 18, 2013

(30) Foreign Application Priority Data
Jul. 23, 2010 (JP) .................................. 2010-166349

(51) Int. Cl.
B01D 46/24 (2006.01)
B28B 11/00 (2006.01)

(52) U.S. Cl.
CPC .......... *B01D 46/2418* (2013.01); *B28B 11/007* (2013.01); *Y10T 29/496* (2015.01); *Y10T 29/53* (2015.01)

(58) Field of Classification Search
CPC ...... B25B 11/005; B25B 11/002; B25B 11/02
See application file for complete search history.

(56) References Cited

U.S. PATENT DOCUMENTS 4,293,357 A    10/1981   Higuchi et al.
5,131,637 A *   7/1992   Vaught ..................... B23Q 3/06
                                                  269/48.3

(Continued)

FOREIGN PATENT DOCUMENTS

JP   63-24731 B2   5/1988
JP   07-213829 A   8/1995

(Continued)

OTHER PUBLICATIONS

International Preliminary Report on Patentability and Written Opinion issued Feb. 12, 2013 in International Application No. PCT/JP2011/066748 to Sumitomo Chemical Co., Ltd.

(Continued)

*Primary Examiner* — Lee D Wilson
(74) *Attorney, Agent, or Firm* — Sughrue Mion, PLLC (57) ABSTRACT

A fixing jig includes a pedestal including a placing surface on which a columnar honeycomb structure is placed, holding members fixed to the pedestal and configured to hold a side surface of the honeycomb structure placed on the placing surface, and drawing and fixing members fixed to the pedestal and configured to draw and fix the surface on the pedestal side in the outer circumferential portion of a mask placed on the honeycomb structure. Consequently, the fixing jig can fix the honeycomb structure and the mask aligned with each other and is less likely to hinder the alignment of the mask.

5 Claims, 6 Drawing Sheets (56) References Cited

U.S. PATENT DOCUMENTS

| | | | | |
|---|---|---|---|---|
| 6,202,292 B1* | 3/2001 | Farnworth | ............ | B25B 11/005 269/21 |
| 7,055,229 B2* | 6/2006 | Wilk | ................ | B24B 37/30 269/21 |
| 2009/0243139 A1 | 10/2009 | Tsuji et al. | | |
| 2010/0218801 A1* | 9/2010 | Sung | ................ | B82Y 30/00 136/244 |
| 2013/0180111 A1* | 7/2013 | Uoe | ................ | B01D 46/2418 29/896.6 |

FOREIGN PATENT DOCUMENTS

| | | |
|---|---|---|
| JP | 2008-55796 A | 3/2008 |
| WO | 2009/119251 A1 | 10/2009 |
| WO | 2012/011582 A1 | 1/2012 |

OTHER PUBLICATIONS

Extended European Search Report issued Dec. 10, 2013 in counterpart European Patent Application No. 11809751.8.

* cited by examiner

FIXING JIG, FIXING METHOD, AND HONEYCOMB FILTER PRODUCTION METHOD

CROSS REFERENCE TO RELATED APPLICATIONS

This application is a National Stage of International Application No. PCT/JP2011/066748 filed Jul. 22, 2011, claiming priority based on Japanese Patent Application No. 2010-166349 filed Jul. 23, 2010, the contents of all of which are incorporated herein by reference in their entirety.

An embodiment of the present invention relates to a fixing jig, a fixing method, and a honeycomb filter production method.

BACKGROUND ART

In the past, a honeycomb filter has been widely known as a filter for a DPF (Diesel particulate filter) or the like. The honeycomb filter includes a structure in which one end sides of a part of through-holes of a honeycomb structure including a large number of through-holes are plugged by a plugging material and the other end sides of the remaining through-holes are plugged by the plugging material. Patent Literature 1 discloses a method of producing such a honeycomb filter. In Patent Literature 1, on one end face of a honeycomb structure 1 arranged in a cylinder 7, a plugging material is pressed against through-holes by a piston 8 via a mask, in which holes are opened in plugging places, whereby the plugging material is supplied to ends of desired through-holes of the honeycomb structure.

CITATION LIST

Patent Literature

Patent Literature 1: Japanese Patent Application Publication No. 63-24731

SUMMARY OF INVENTION

Technical Problem

Incidentally, it is necessary to firmly fix the mask and the honeycomb structure to prevent relative positions of the mask and the through-holes from deviating until the plugging material is supplied to the desired through-holes of the honeycomb structure via the mask after the positions of the through-holes of the honeycomb structure and the holes of the mask are aligned.

When such fixing is possible, it is also possible to move the honeycomb structure and the mask aligned each other to a plugging device provided in a place different from the place of an aligning device and perform work in places different from each other.

However, such a fixing jig needs to include structure that does not hinder aligning work and plugging work.

An embodiment of the present invention has been made in view of the problems and has an object of providing a fixing jig that can fix a honeycomb structure and a mask aligned with each other and is less likely to hinder, for example, alignment of the mask, a fixing method, and a honeycomb filter production method.

Solution to Problem

A fixing jig according to an embodiment of the present invention includes: a pedestal including a placing surface, a columnar honeycomb structure being placed on the placing surface; holding members fixed to the pedestal and configured to hold a side surface of the honeycomb structure placed on the placing surface; and drawing and fixing members fixed to the pedestal and configured to draw and fix the surface on the pedestal side in the outer circumferential portion of a mask placed on the honeycomb structure.

According to the embodiment of the present invention, the holding members hold the side surface of the honeycomb structure. Consequently, it is possible to perform adjustment of the position of the mask on an end face of the honeycomb structure without being hindered by the holding members in a state in which the honeycomb structure is fixed to the pedestal. The drawing and fixing members draw and fix the surface on the pedestal side in the outer circumferential portion of the mask. Therefore, in alignment of the mask, the drawing and fixing members are less likely to hinder the movement of the mask. It is possible to firmly fix the mask. Positional deviation during fixing of the mask is less easily caused. With such holding members and an drawing and fixing members, since the holding members and the drawing and fixing members are less likely to hinder plugging work when the plugging work is performed on the upper surface of the mask. Therefore, it is possible easily perform the plugging work. In this specification, the "surface on the pedestal side in the outer circumferential portion of the mask" means, for example, a portion (the outer circumferential portion of the mask) protruding to the outer side of an end face on the upper side of the honeycomb structure, which is the surface on the lower side (the surface on the pedestal side) of the mask, when the mask is placed on the end face on the upper side of the honeycomb structure in a state in which an end face on the lower side of the honeycomb structure is fixed to the pedestal.

The holding members can include a plurality of air pickers arranged to surround the side surface of the honeycomb structure. The air pickers can include rubber hollow bodies that expand when gas is supplied thereto. In this case, it is possible to easily fix the honeycomb structure.

The drawing and fixing members can include electromagnets. Consequently, for example, it is easy to generate a magnetic field by feeding an electric current to the electromagnets and fix the mask after alignment. When the drawing and fixing members include electromagnets and electromagnets capable of generating a magnetic field for weakening a magnetic field of the permanent magnets, it is possible to weaken the magnetic field of the permanent magnet to facilitate the alignment of the mask by feeding an electric current to the electromagnets and thereafter break the electric current to thereby fix the mask using the magnetic field of the permanent magnet. In this case, the electric current is not consumed in a fixed state of the mask.

When the mask is fixed by a magnetic force, it is less likely that positional deviation of the mask occurs during a fixing operation. Further, unnecessary distortion is less likely to occur in the fixed mask.

The drawing and fixing members may include vacuum pads.

A fixing method for a honeycomb structure and a mask according to the embodiment of the present invention includes: a step of holding a side surface of the honeycomb structure placed on a placing surface of a pedestal; a step of aligning the positions of through-holes of the honeycomb structure and holes of the mask on an end face of the honeycomb structure; and a step of drawing and fixing, with drawing and fixing members fixed to the pedestal, the surface on the pedestal side in the outer circumferential portion of the aligned mask.

According to the embodiment of the present invention, there are effects same as the effects of the aligning apparatus explained above.

A honeycomb filter production method according to the embodiment of the present invention includes: the fixing method explained above; and a step of supplying a plugging material to the through-holes of the honeycomb structure via the drawn and fixed mask.

The drawing and fixing step and the step of supplying the plugging material can be performed in places apart from each other. The method can further include, between the drawing and fixing step and the step of supplying the plugging material, a step of moving a fixing jig that holds the honeycomb fixing member and draws and fixes the mask.

Consequently, it is possible to perform the alignment and the plugging in places apart from each other and perform the respective steps in optimum environment independent from each other.

Advantageous Effects of Invention

According to the embodiment of the present invention, it is possible to provide the fixing jig or the like that can fix the honeycomb structure and the mask aligned with each other and is less likely to hinder the alignment of the mask.

DESCRIPTION OF EMBODIMENTS

An embodiment of a fixing jig according to the present invention is explained with reference to the drawings. In the explanation, the same reference numerals and signs are used for the same components or components having the same functions and redundant explanation of the components is omitted.

Figure 1:
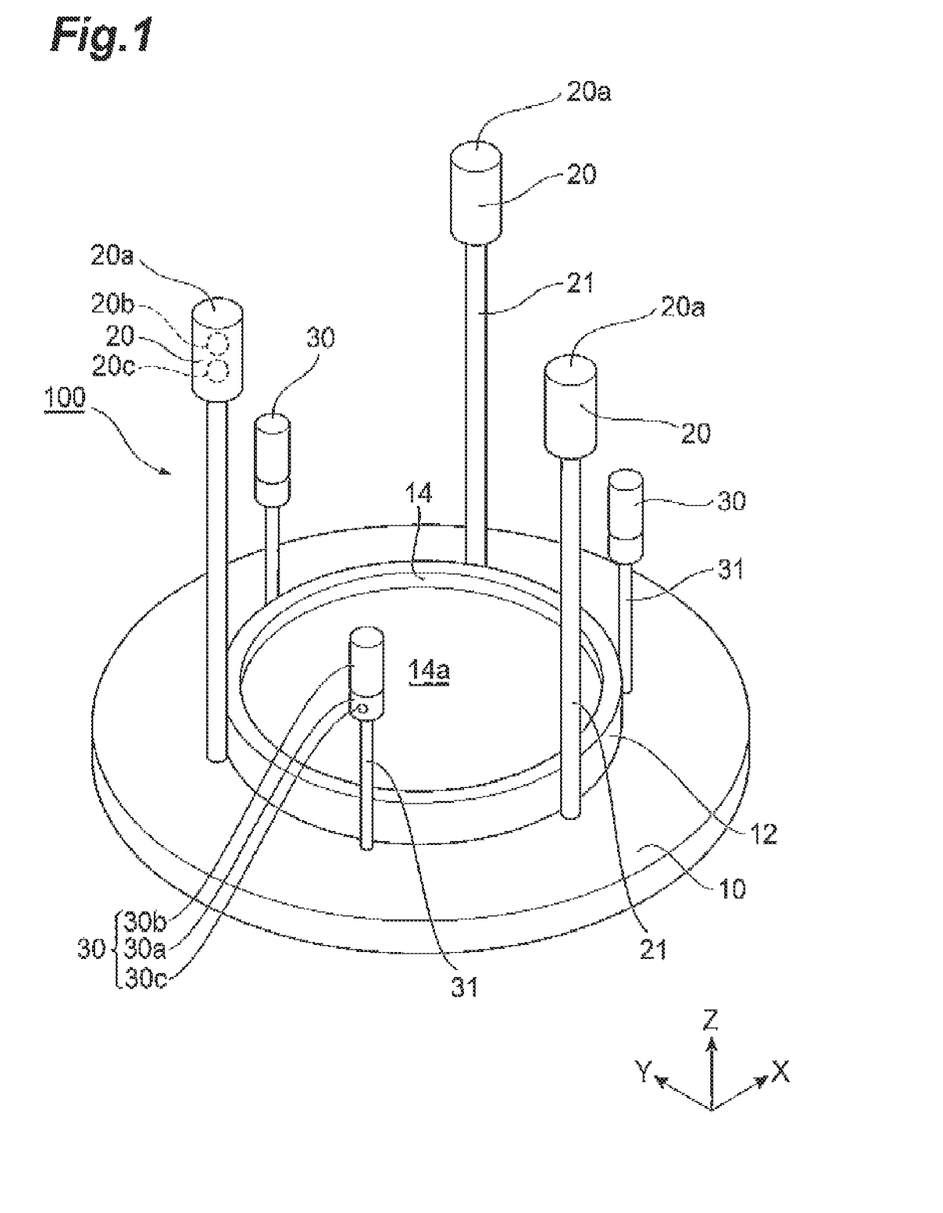
FIG. 1 is a perspective view of a fixing jig according to an embodiment of the present invention.
Figure 2:
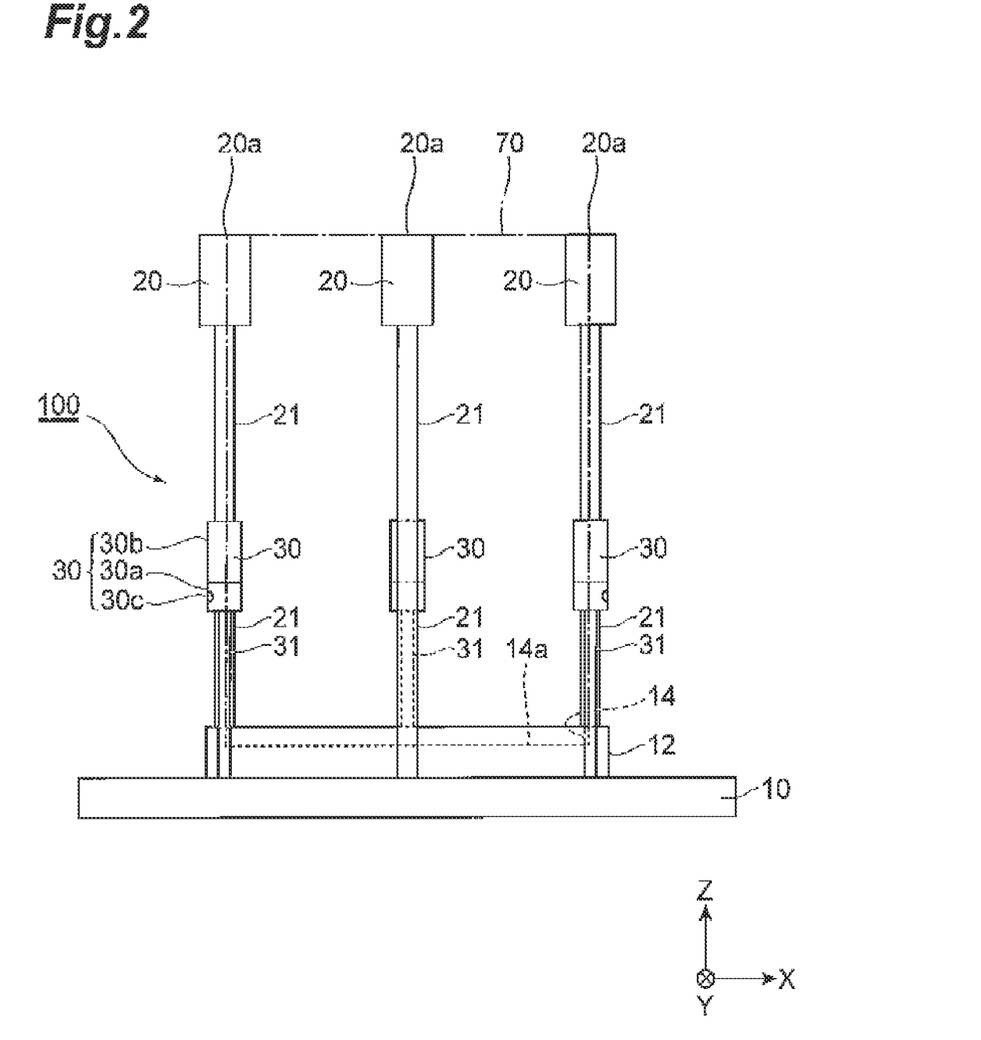
FIG. 2 is a side view of FIG. 1.
Figure 3:
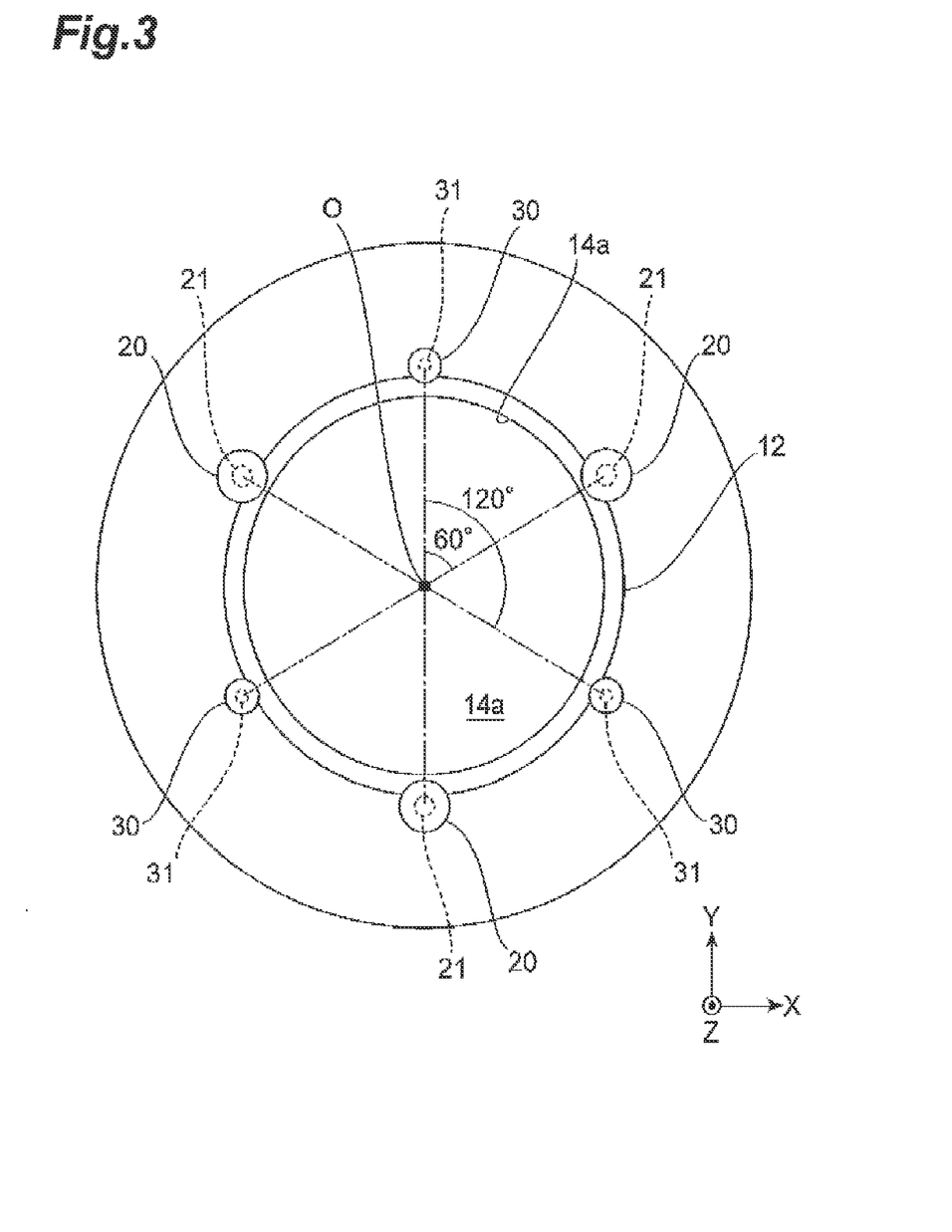
FIG. 3 is a top view of FIG. 1.

FIG. 1 is a perspective view of a fixing jig 100 according to this embodiment. FIG. 2 is a side view of the fixing jig 100. FIG. 3 is a top view of the fixing jig 100. The fixing jig 100 according to this embodiment mainly includes a pedestal 10, air pickers (holding members) 30, and electromagnetic holders (drawing and fixing members) 20.

The pedestal 10 assumes a substantially disc shape and includes a disc-like projection 12 in the center portion of the upper surface. A disc-like recess 14 is formed in the center portion of the upper surface of the projection 12. The upper surface of the recess 14 is a placing surface 14a on which an end face of the honeycomb structure is placed. The diameter of the recess 14 is set to a size for enabling the recess 14 to house an end of the honeycomb structure (explained in detail below (see FIG. 4)).

Figure 4:
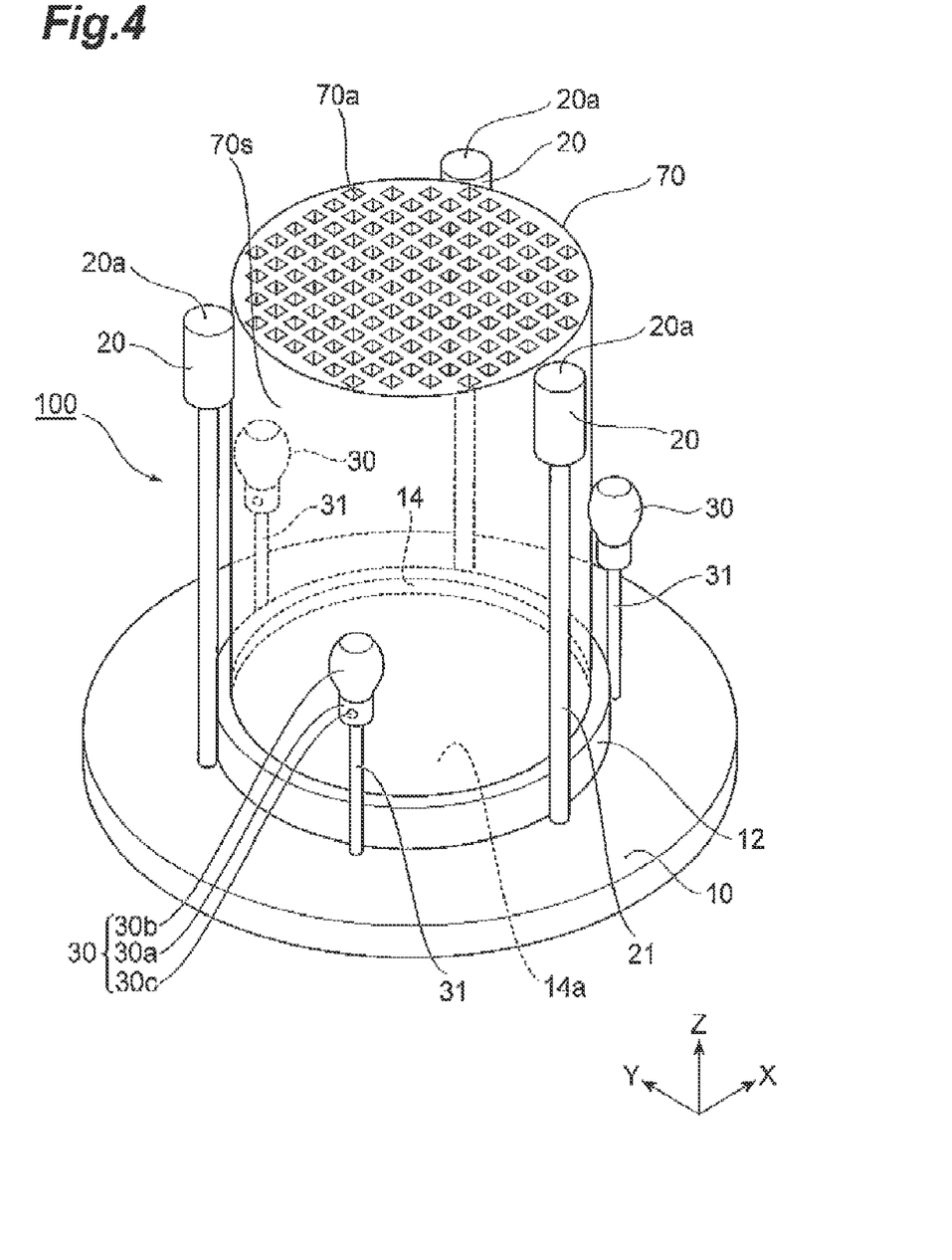
FIG. 4 is a perspective view for explaining a honeycomb filter production method according to the embodiment of the present invention.

Referring back to FIG. 1, the air pickers 30 are attached to the upper ends of supporting bars 31. Three supporting bars 31 are arranged to surround the placing surface 14a. Therefore, in this embodiment, the fixing jig 100 includes three air pickers 30. As shown in FIG. 3, the three air pickers 30 are arranged in positions 120 degrees apart from one another around a center O of the placing surface 14a. As shown in FIG. 4, the air pickers 30 are arranged in positions where the air pickers 30 can hold, from three directions, a side surface 70s of the honeycomb structure placed on the placing surface 14a.

Referring back to FIG. 1, the air pickers 30 include base sections 30a having gas outlet and inlet ports 30c and rubber hollow bodies 30b that can inflate with gas supplied from the gas outlet and inlet ports 30c. When the gas is supplied to the air pickers 30 from the gas outlet and inlet ports 30c, the rubber hollow bodies 30b inflate and can press the side surface of the honeycomb structure from three directions. On the other hand, when the gas is discharged from the gas outlet and inlet ports 30c, the rubber hollow bodies 30b deflate and stop pressing the side surface of the honeycomb structure. Piping for the gas is not shown in the figure.

Figure 5:
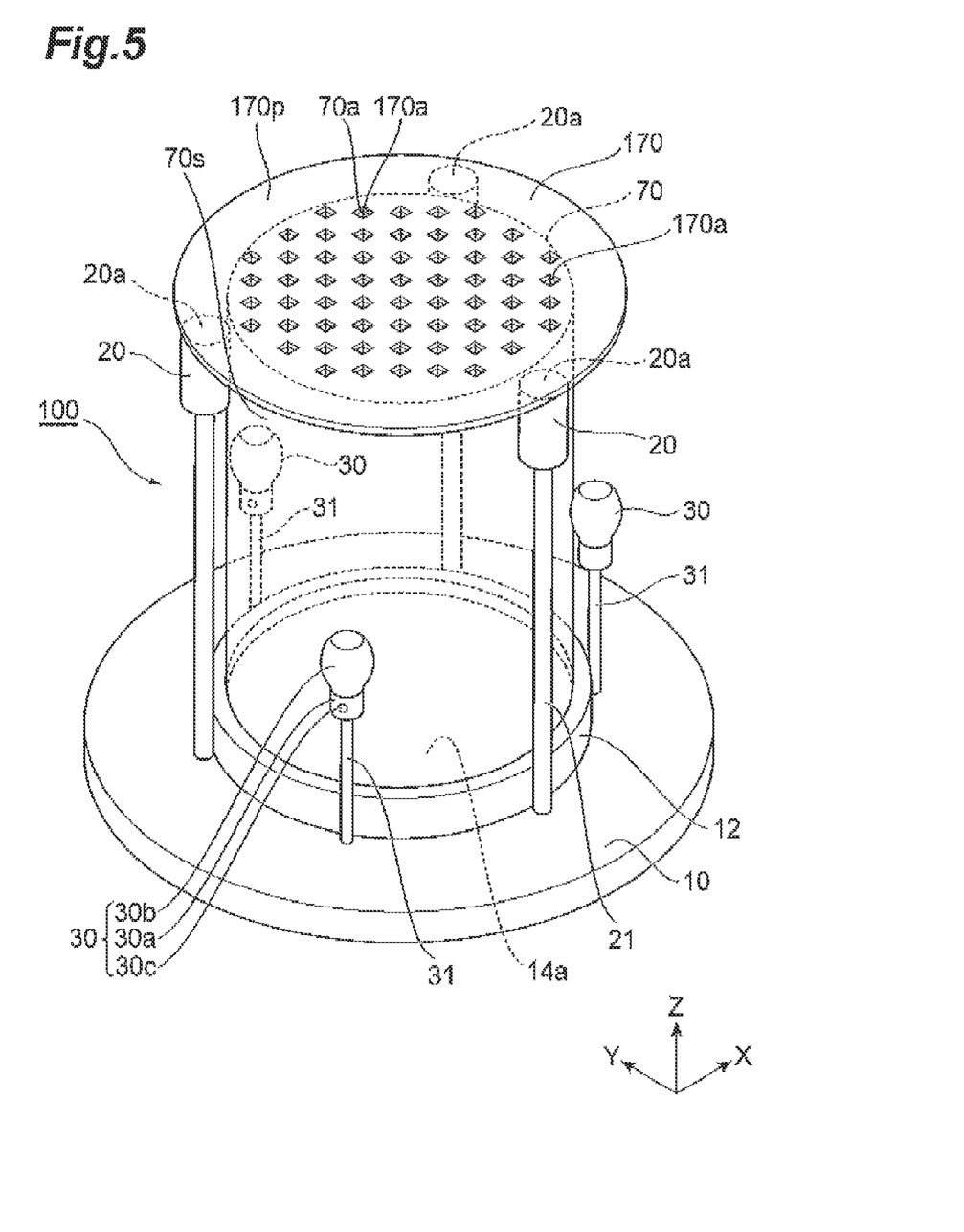
FIG. 5 is a perspective view following FIG. 4 for explaining the honeycomb filter production method according to the embodiment of the present invention.

The electromagnetic holders 20 are attached to the upper ends of supporting bars 21. Three supporting bars 21 are arranged to surround the placing surface 14a. Therefore, in this embodiment, the fixing jig 100 includes three electromagnetic holders 20. As shown in FIG. 3, the three electromagnetic holders 20 are arranged in positions 120 degrees apart from one another around the center O of the placing surface 14a. As shown in FIG. 5 (explained in detail below), the electromagnetic holders 20 are arranged in positions opposing three directions on the lower surface of an outer circumferential portion 170p of a mask 170 arranged on the upper surface of a honeycomb structure 70. As shown in FIG. 3, the electromagnetic holders 20 and the air pickers 30 are arranged in positions 60 degrees apart from each other around the center O of the placing surface 14a.

As shown in FIG. 1, upper surfaces 20a of the electromagnetic holders 20 are formed as planes. As shown in FIG. 2, the positions of the upper surfaces 20a of the electromagnetic holders 20 are set to be flush with the upper end face of the honeycomb structure 70 placed on the placing surface 14a.

As shown in FIG. 1, the electromagnetic holders 20 include, on the insides thereof, permanent magnets 20b that emit magnetic fluxes from the upper surfaces 20a and electromagnets 20c that can emit magnetic fluxes in a direction opposite to the direction of the magnetic fluxes of the permanent magnets 20b. When an electric current is not flowing to the electromagnets 20c, the lower surface of a metal plate having magnetism on the upper surfaces 20a can be drawn, fixed and anchored by a magnetic field of the permanent magnets 20b. On the other hand, when an electric current is flowing to the electromagnets 20c, the magnetic field of the permanent magnets 20b is weakened by a magnetic field of the electromagnets. Therefore, it is possible to easily move the metal plate on the upper surfaces 20a.

(Production Method)

Figure 6:
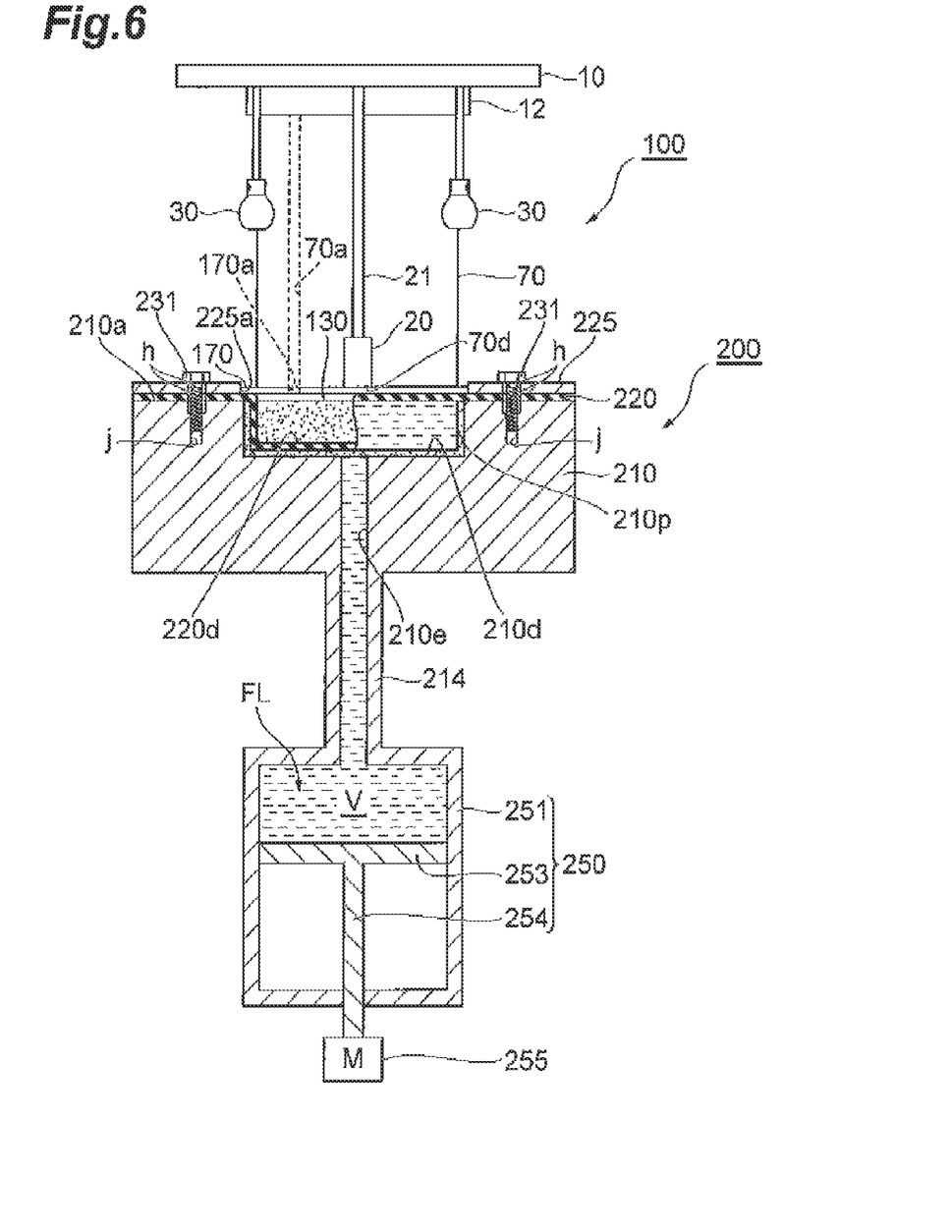
FIG. 6 is a partial sectional view following FIG. 5 for explaining the honeycomb filter production method according to the embodiment of the present invention.

Subsequently, a method of producing a plugged honeycomb filter using the fixing jig 100 is explained with reference to FIGS. 4 to 6.

First, the honeycomb structure 70 is prepared. As shown in FIG. 4, the honeycomb structure 70 is a columnar body including a plurality of through-holes 70a extending in parallel to one another.

The length of the honeycomb structure 70 in a direction in which the through-holes 70a extend is not specifically limited. However, the length can be set to, for example, 40 to 350 mm. The outer diameter of the honeycomb structure 70 is not specifically limited either. However, the outer diameter can be set to, for example, 100 to 320 mm. As the size of the cross sections of the through-holes 70a, for example, when the through-holes 70a have a square shape, one side can be set to 0.8 to 2.5 mm. The thickness of partition walls, which are spaces among the through-holes 70a, can be set to 0.05 to 0.5 mm.

The honeycomb structure 70 can be a green (an un-burned body) that changes to porous ceramics by being burned later. In this case, the honeycomb structure 70 can be a compact including a ceramics raw material or a compact of ceramics particles. The ceramics is not specifically limited. Examples of the ceramics include alumina, silica, mullite, cordierite, glass, an oxide such as aluminum titanate, silicon carbide, silicon nitride, and metal. Aluminum titanate can further include magnesium and/or silicon. Such a honeycomb structure 70 includes inorganic compound source powder, an organic binder such as methyl cellulose, and an additive to be added according to necessity.

For example, when the ceramics is aluminum titanate, the organic compound source powder includes aluminum source powder such as a aluminum powder and titanium source powder such as titania powder of an anatase type or a rutile type. The organic compound source powder can further include, according to necessity, magnesium source powder such as magnesia powder or magnesia spinel powder and/or silicon source powder such as silicon oxide powder or glass flit.

As the organic binder, celluloses such as methyl cellulose, carboxymethyl cellulose, hydroxyalkyl methyl cellulose, and sodium carboxyl methyl cellulose, alcohols such as polyvinyl alcohol, and lignin sulphonic acid can be illustrated.

Examples of the additive include a pore forming agent, a lubricant and a plasticizer, a dispersant, and a solvent.

Examples of the pore forming agent include a carbon material such as graphite, resins such as polyethylene, polypropylene, and polymethylmethacrylate, plant materials such as starch, nuts husk, walnut husk, and corn, ice, and dry ice.

Examples of the lubricant and the plasticizer include alcohols such as glycerin, higher fatty acids such as caprylic acid, lauric acid, palmitic acid, arachidic acid, oleic acid, and stearic acid, stearic acid metal salt such as stearic acid Al, and polyoxyalkylene alkyl ether. Loading of the lubricant and the plasticizer can be set to 0 to 10 parts by weight and can be 0.1 to 5 parts by weight with respect to 100 parts by weight of the inorganic compound source powder.

Examples of the dispersant include inorganic acids such as nitric acid, hydrochloric acid, and sulfuric acid, organic acids such as oxalic acid, citric acid, acetic acid, malic acid, and lactic acid, alcohols such as methanol, ethanol, and propanol, and surface active agents such as polycarboxylic acid ammonium. Loading of the dispersant can be set to 0 to 20 parts by weight and can be set to 2 to 8 parts by weight with respect to 100 parts by weight of the inorganic compound source powder.

As the solvent, for example, alcohols such as methanol, ethanol, butanol, and propanol, glycols such as propylene glycol, polypropylene glycol, and ethylene glycol, and water can be used.

Such a honeycomb structure 70 can be produced, for example, as explained below. First, the inorganic compound source powder, the organic binder, the solvent, and the additive to be added according to necessity are prepared. These are mixed by a kneading machine or the like to obtain a raw material mixture. The obtained raw material mixture is extruded from an extruder including an outlet opening corresponding to the shape of the partition walls. After being cut into desired length, the raw material mixture is dried by a publicly-known method, whereby the honeycomb structure 70 can be obtained.

The honeycomb structure may be a burned body (e.g., porous ceramics) rather than the un-burned body.

Subsequently, the honeycomb structure 70 is placed on the placing surface 14a such that one end face (the lower surface) including an opening is opposed to the placing surface 14a. Subsequently, as shown in FIG. 4, the rubber hollow bodies 30b are inflated by supplying the gas from the gas outlet and inlet ports 30c of the air pickers 30. The side surface 70s of the honeycomb structure 70 is held from the three directions by the rubber hollow bodies 30b. Consequently, the honeycomb structure 70 is fixed to the pedestal 10.

Subsequently, the mask 170 shown in FIG. 5 is prepared. The mask 170 is a circular tabular member including a large number of through-holes 170a. A plane shape of the through-holes 170a can be set in, for example, a square shape corresponding to the through-holes 70a (see FIG. 4) of the honeycomb structure 70. As shown in FIG. 5, the plurality of through-holes 170a are arranged in checkered pattern. The respective through-holes 170a are arranged to be opposed to only a plurality of through-holes, which are not adjacent to the through-holes 170a above and under and on the left and right of the through-holes 170a, among the plurality of through-holes 70a of the honeycomb structure 70 arranged in a square shown in FIG. 4. The outer diameter of the mask 170 is set larger than the outer diameter of the honeycomb structure 70. The mask 170 includes an annular outer circumferential portion 170p not opposed to the honeycomb structure 70. The mask 170 can be a mask made of a ferromagnetic material attractable and fixable by a magnetic force, for example, ferrite stainless steel such as SUS 430 in order to enable drawing and fixing by the electromagnetic holders 20. The thickness of the mask 170 can be set to, for example, 0.1 to 1 mm.

The mask 170 is placed on the upper surface of the honeycomb structure 70. The positions of the through-holes 70a of the honeycomb structure 70 and the through-holes 170a of the mask 170 are aligned such that the through-holes 70a of the honeycomb structure 70 to be plugged and the through-holes 170a of the mask 170 communicate with each other and the through-holes of the honeycomb structure 70 not desired to be plugged are shielded.

A method of the alignment is not specifically limited. A user may align the through-holes by moving the mask 170 by hand while viewing the mask 170, may align the through-holes by moving the mask and the fixing jig using a publicly-known fine adjustment while viewing the mask and the fixing jig, or may control a moving distance using a publicly-known image processing method.

In the alignment, the upper surfaces 20a of the respective electromagnetic holders 20 are opposed to the outer circumferential portion 170p of the mask 170. An electric current is fed to the electromagnets 20c of the electromagnetic holders 20 and magnetic fluxes of the permanent magnets 20b are cancelled, whereby generation of an drawing and fixing force by the upper surfaces 20a of the electromagnetic holders 20 is suppressed to allow the mask 170 to freely move in the horizontal direction on the upper surfaces 20a of the electromagnetic holders 20.

After the alignment is completed, the electric current to the electromagnets 20c of the respective electromagnetic holders 20 is broken. The lower surface of the outer circumferential portion 170p of the mask 170 is drawn and fixed by the magnetic fluxes by the permanent magnets 20b. Consequently, the mask 170 is fixed to the pedestal 10 in a state in which the positions of the honeycomb structure 70 and the mask 170 are aligned.

Subsequently, the desired through-holes 70a of the honeycomb structure 70 are plugged via the through-holes 170a of the mask 170. A plugging method is not specifically limited. However, for example, a device shown in FIG. 6 can be used. A plugging device 200 according to this embodiment mainly includes a main body section 210, an elastic plate 220, and a pump 250.

The main body section 210 is formed of a rigid material. Examples of the rigid material include metal such as stainless steel and a polymer material such as fiber reinforced plastic. A columnar recess 210d is formed on an upper surface 210a of the main body section 210. A porous member 210p is stuck to the inner surface of the recess 210d.

The elastic plate 220 is arranged on the upper surface 210a of the main body section 210 to cover an opening surface of the recess 210d. The elastic plate 220 has elasticity and can be easily deformed. The elastic plate 220 can be a rubber plate. Examples of rubber include natural rubber and synthetic rubber such as styrene-butadiene rubber, butadiene rubber, butyl rubber, ethylene-propylene rubber, nitrile rubber, chloroprene rubber, fluorocarbon rubber, silicone rubber, and urethane rubber. The thickness of the elastic plate 220 is not specifically limited. However, the thickness can be set to, for example, 0.3 to 3.0 mm.

The elastic plate 220 is fixed to the main body section 210 by a ring member 225 and bolts 231. The ring member 225 includes an opening 225a in a position corresponding to the recess 210d of the main body section 210 to thereby assume an annular shape. The ring member 225 is arranged on the elastic plate 220 such that a center portion (a portion opposed to the recess 210d) in the elastic plate 220. Consequently, the outer circumferential portion of the elastic plate 220 is held by the main body section 210 and the ring member 225. Through-holes h are respectively formed in the ring member 225 and the elastic plate 220. Screw holes j corresponding to the through-holes h are formed in the main body section 210. The bolts 231 are arranged to pierce through the through-holes h and screwed into the screw holes j and fixed, whereby the outer circumferential portion of the elastic plate 220 is closely attached and fixed to a portion around the recess 210d on the upper surface 210a of the main body section 210.

The main body section 210 further includes a communicating path 210e that communicates with the porous member 210p of the bottom surface of the recess 210d. The pump 250 is connected to the communicating path 210e via a connecting pipe 214.

The pump 250 includes a cylinder 251, a piston 253 arranged in the cylinder 251, and a piston rod 254 connected to the piston 253. A motor 255 that reciprocatingly moves the piston rod 254 in the axis direction is connected to the piston rod 254.

In this embodiment, a closed space V formed by the main body section 210, the connecting pipe 214, and the cylinder 251 is formed between the elastic plate 220 and the piston 253. Fluid FL such as gas or liquid is filled in the closed space V. It is possible to discharge the fluid FL from the inside of the recess 210d of the main body section 210 and closely attach the elastic plate 220 to the inner surface of the recess 210d to form a recess 220d of the elastic plate 220 by moving the piston 53 (a state on the left side of the recess 210d shown in FIG. 5). It is possible to separate the elastic plate 220 from the bottom portion of the recess 210d by supplying the fluid FL to the inside of the recess 210d (a state on the right side of the recess 210d shown in FIG. 5).

The piston 253 is lowered in advance, whereby the recess 220d of the elastic plate 220 is formed and a plugging material 130 is stored in the recess 220d as indicated by the left side of the recess 210d shown in FIG. 5.

The plugging material 130 is not specifically limited as long as the plugging material 130 can close ends of the through-holes 70a of the honeycomb structure 70. However, the plugging material 130 can be liquid. For example, as the plugging material, slurry including a ceramic material or a ceramics raw material, a binder, and a solvent can be illustrated.

Examples of the ceramics material include a constituent material of the honeycomb structure and a raw material of the constituent material.

As the binder, organic binders of celluloses such as methyl cellulose, carboxymethyl cellulose, hydroxyalkyl methyl cellulose, and sodium carboxyl methyl cellulose, alcohols such as polyvinyl alcohol, and lignin sulphonic acid can be illustrated. Usage of the binder can be set to, for example, 30.2 to 5000 parts by mass with respect to 100 parts by mass of the ceramics source powder.

Example of the lubricant include alcohols such as glycerin, higher fatty acids such as caprylic acid, lauric acid, palmitic acid, arachidic acid, oleic acid, and stearic acid, stearic acid metal salt such as stearic acid Al, and polyoxyalkylene alkyl ether. Usage of the lubricant can be set to 2 to 20 parts by mass with respect to 100 parts by mass of the ceramics source powder.

As the solvent, for example, alcohols such as methanol, ethanol, butanol, and propanol, glycols such as propylene glycol, polypropylene glycol, and ethylene glycol, water, deionized water can be used. Above all, the solvent can be the water. The deionized water is used because the deionized water contains little impurities. Usage of the solvent can be set to, for example, 1520 to 460 parts by mass with respect to 100 parts by mass of the ceramics material.

Subsequently, the fixing jig 100 is arranged on the recess 210d of the main body section 210. The fixing jig 100 is turned upside down from the state shown in FIG. 5 to place the mask 170 on the lower side and place the pedestal 10 on the upper side. The mask 170 is arranged in the opening 225a of the ring member 225 such that the mask 170 is opposed to the recess 220d of the elastic plate 220.

Subsequently, the piston of the pump 250 is moved upward, whereby the fluid FL is supplied to the inside of the recess 210d and the elastic plate 220 is moved toward the mask 170 as indicated by the right side of the recess 210d shown in FIG. 5. Consequently, the plugging material 130 is supplied to the inside of a part of the through-holes 70a of the honeycomb structure 70 via the through-holes 170a of the mask 170 and plugged portions are formed.

Subsequently, the piston 53 is further lifted to further supply the fluid FL to between the elastic plate 220 and the main body section 210. The elastic plate 220 is deformed in a convex shape in the upward direction. The fixing jig 100 that fixes the honeycomb structure 70 and the mask is separated from the elastic plate 220. Thereafter, the electromagnets of the electromagnetic holders 20 are driven to remove the mask. Thereafter, the air pickers 30 are contracted. Consequently, the honeycomb structure 70 can be removed from the pedestal 10. According to necessity, fixing of the mask and plugging on the other surface of the honeycomb structure 70 can be performed by the same operation. The plugged honeycomb structure is dried and burned, whereby a honeycomb filter can be produced.

According to this embodiment, the air pickers 30 hold the side surface 70s of the honeycomb structure 70. Consequently, in a state in which the honeycomb structure 70 is fixed to the pedestal 10, adjustment of the position of the mask can be performed on the upper surface of the honeycomb structure 70 without being hindered by the air pickers 30. The electromagnetic holders 20 draw and fix the lower surface (the surface on the pedestal 10 side) of the outer circumferential portion 170p of the mask 170. Therefore, when the mask is aligned, the electromagnetic holders 20 are less likely to hinder the movement of the mask 170. Moreover, the mask 170 can be firmly fixed. Further, since the electromagnetic holders 20 are used, positional deviation of the mask 170 hardly occurs when the mask 170 is fixed. When the mask is fixed, unnecessary distortion is less likely to be caused in the mask 170.

Further, with the fixing jig 100 that fixes the honeycomb structure 70 and the mask 170 in this way, it is easy to move the honeycomb structure 70 to the plugging device present in a remote place without deviating the positional relation of the honeycomb structure 70 and the mask 170. The air pickers 30 and the electromagnetic holders 20 hardly become obstacles when plugging work is performed on the upper surface of the mask 170. Therefore, it is possible to easily perform the plugging work as well.

The three air pickers are arranged 120 degrees apart from one another viewed from a direction orthogonal to the placing surface 14a as shown in FIG. 3. Therefore, it is possible to firmly fix the honeycomb structure 70.

The present invention is not limited to the embodiment. Various modifications are possible. For example, in the embodiment, the arrangement positions of the three air pickers 30 are set in the positions 120 degrees apart from one another viewed from a Z axis shown in FIG. 3. The present invention can also be carried out even when an angle of the arrangement of the air pickers 30 is not 120 degrees. For example, the air pickers 30 can be arranged in positions 80 to 100 degrees apart from one another. The present invention can also be carried out even when the number of the air pickers 30 is two or four or more rather than three. An angle of the arrangement of n air pickers 30 can be set to 360/n. From the viewpoint of firmly fixing the honeycomb structure 70, three or more air pickers 30 can be provided to surround the side surface of the honeycomb structure 70.

In the embodiment, the air pickers 30 are adopted as the holding members for the side surface of the honeycomb structure. However, the present invention can also be carried out even when the holding members are not the air pickers as long as the holding members can hold the side surface of the honeycomb structure. For example, rubber rollers having an elliptical shape in horizontal cross section may be used. The rubber rollers are configured pivotable such that, when fixed, major axis sides of the rubber rollers come into contact with and hold the side surface of the honeycomb structure and, when not fixed, minor axis sides of the rubber rollers oppose the side surface of the honeycomb structure while separating from the side surface and do not hold the side surface. Further, the side surface of the honeycomb structure may be held by a belt-like member.

In the embodiment, the arrangement positions of the three electromagnetic holders 20 are set in the positions 120 degree apart from one another viewed from the Z axis shown in FIG. 3. However, the present invention can also be carried out even when an angle of the arrangement of the electromagnetic holders 20 is not 120 degrees. For example, the electromagnetic holders 20 can be set in positions 80 to 100 degrees apart from one another. The present invention can also be carried out even when the number of the electromagnetic holders 20 is two or four or more rather than three. An angle of the arrangement of n electromagnetic holders 20 can be set to 360/n. Three or more electromagnetic holders 20 can be provided to surround the side surface of the honeycomb structure 70.

In the embodiment, the electromagnetic holders 20 including the permanent magnets and the electromagnets are adopted as the drawing and fixing members on the lower surface of the outer circumferential portion 170b of the mask 170. However, electromagnetic holders are not limited to the electromagnetic holders explained above as long as the electromagnetic holders can switch an drawn and fixed state and an un-drawn and un-fixed state. For example, the electromagnetic holders may be electromagnetic holders including only electromagnets without including permanent magnets. Alternatively, vacuum pads may be used.

In the embodiment, the electromagnetic holders 20 and the air pickers 30 are arranged in the positions 60 degrees apart from each other. However, the present invention is not limited to this. If the positions of the electromagnetic holders 20 and the air pickers 30 in the height direction of the Z axis are different, the present invention can also be carried out even when an angle between the electromagnetic holders 20 and the air pickers 30 is 0 degree, i.e., the electromagnetic holders 20 and the air pickers 30 overlap each other viewed from the Z axis.

The shape of the pedestal 10 is not specifically limited. A method of fixing the air pickers 30 and the electromagnetic holders 20 to the pedestal 10 is not specifically limited. When the air pickers 30 and the electromagnetic holders 20 are supported by the supporting bars 21 and 31, since a gap is formed between the supporting bars, it is easy to place and remove the honeycomb structure 70.

The shape and the structure of the honeycomb structure 70 are not limited to those explained above. For example, the external shape of the honeycomb structure 70 does not have to be the columnar shape and may be a rectangular columnar shape such as a square columnar shape. The sectional shape of the through-holes 70a of the honeycomb structure 70 does not have to be the square shape and may be, for example, a rectangular shape, a triangular shape, a polygonal shape, or a circular shape. Further, the arrangement of the through-holes 70a does not have to be the square arrangement and may be, for example, a triangular arrangement or a checkered pattern arrangement.

A form of the mask 170 and a pattern of the through-holes of the mask are free. Further, a form of the plugging device 200 is not specifically limited.

INDUSTRIAL APPLICABILITY

With the fixing jig, the fixing method, and the honeycomb filter production method according to the embodiment of the present invention, a fixing jig and the like are provided that can fix a honeycomb structure and a mask aligned with each other and is less likely to hinder alignment of the mask.

REFERENCE SIGNS LIST 70 honeycomb structure
10 pedestal
14a placing surface
30 air pickers (holding members)
30b rubber hollow bodies
20 electromagnetic holders (drawing and fixing members)
20a surfaces
20b permanent magnets
20c electromagnets
100 fixing jig

The invention claimed is:

1. A fixing jig comprising:
a pedestal including a placing surface, a columnar honeycomb structure being placed on the placing surface;
holding members fixed to the pedestal and configured to hold a side surface of the honeycomb structure placed on the placing surface; and
drawing and fixing members fixed to the pedestal and configured to draw and fix a surface on the pedestal side in an outer circumferential portion of a mask placed on the honeycomb structure;
wherein the holding members include a plurality of air pickers arranged to surround the side surface of the honeycomb structure, and the air pickers include rubber hollow bodies that expand when gas is supplied thereto.

2. The fixing jig according to claim 1, wherein the drawing and fixing members include electromagnets.

3. The fixing jig according to claim 1, wherein the drawing and fixing members include permanent magnets and electromagnets capable of generating a magnetic field for weakening a magnetic field of the permanent magnets.

4. The fixing jig according to claim 1, wherein the drawing and fixing members include vacuum pads.

5. The fixing jig according to claim 2, wherein the drawing and fixing members include permanent magnets and electromagnets capable of generating a magnetic field for weakening a magnetic field of the permanent magnets.

* * * * *